(12) United States Patent
Ruby et al.

(10) Patent No.: US 9,561,716 B2
(45) Date of Patent: Feb. 7, 2017

(54) COOLING OF AN ELECTRIC MOTOR VIA HEAT PIPES

(75) Inventors: Stephane Ruby, Rueil-Malmaison (FR); Jean-Pierre Le Lagadec, Puteaux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 217 days.

(21) Appl. No.: 14/344,768

(22) PCT Filed: Jul. 2, 2012

(86) PCT No.: PCT/FR2012/051519
§ 371 (c)(1),
(2), (4) Date: Apr. 9, 2014

(87) PCT Pub. No.: WO2013/038078
PCT Pub. Date: Mar. 21, 2013

(65) Prior Publication Data
US 2014/0338857 A1    Nov. 20, 2014

(30) Foreign Application Priority Data

Sep. 13, 2011 (FR) ...................................... 11 58128

(51) Int. Cl.
*F25B 27/00* (2006.01)
*F25D 11/00* (2006.01)
(Continued)

(52) U.S. Cl.
CPC ................. *B60K 11/02* (2013.01); *B60K 1/00* (2013.01); *F01P 3/20* (2013.01); *F28D 15/02* (2013.01);
(Continued)

(58) Field of Classification Search
CPC .................... F01P 2003/2278; F01P 2011/205; F01P 2050/24; B60K 2001/003; B60K 2001/006; B60K 11/02; F28D 15/02
(Continued)

(56) References Cited

U.S. PATENT DOCUMENTS

| 5,938,114 A | 8/1999 | Zeyen et al. |
| 2005/0022769 A1 | 2/2005 | Kuze et al. |

(Continued)

FOREIGN PATENT DOCUMENTS

| EP | 0 827 853 A2 | 3/1998 |
| EP | 2 233 340 A2 | 9/2010 |

(Continued)

OTHER PUBLICATIONS

International Search Report issued Oct. 11, 2012, in PCT/FR12/051519 filed Jul. 2, 2012.
(Continued)

*Primary Examiner* — Ryan J Walters
*Assistant Examiner* — Joseph Trpisovsky
(74) *Attorney, Agent, or Firm* — Oblon, McClelland, Maier & Neustadt, L.L.P.

(57) ABSTRACT

System (10) for cooling an electric motor (12) of a vehicle with a hybrid motor comprising an electric motorization system (12) and an internal combustion motorization system (11), the internal combustion motorization system (11) comprising at least one fluid circulation circuit, characterized in that the system comprises a heat storage tank (14), in that said tank is connected to the fluid circulation circuit and to the electric motorization system via heat pipes (20).

9 Claims, 2 Drawing Sheets

(51) Int. Cl.
   *F25B 7/00* (2006.01)
   *F25D 17/02* (2006.01)
   *B60H 1/32* (2006.01)
   *B60K 11/02* (2006.01)
   *F01P 3/20* (2006.01)
   *B60K 1/00* (2006.01)
   *F28D 15/02* (2006.01)
   *F01P 3/22* (2006.01)
   *F01P 11/20* (2006.01)

(52) U.S. Cl.
   CPC .. *B60K 2001/008* (2013.01); *F01P 2003/2278* (2013.01); *F01P 2011/205* (2013.01); *F01P 2050/24* (2013.01)

(58) Field of Classification Search
   USPC ............ 62/323.3, 133, 201, 79, 185, 259.2, 62/238.1, 430, 434; 165/41, 104.26
   See application file for complete search history.

(56) References Cited

U.S. PATENT DOCUMENTS

| | | | |
|---|---|---|---|
| 2007/0062745 A1* | 3/2007 | Gebert | B60K 6/48 180/65.245 |
| 2010/0026109 A1* | 2/2010 | Hassett et al. | 310/54 |
| 2010/0175413 A1* | 7/2010 | Tsubone | 62/324.4 |
| 2010/0243215 A1 | 9/2010 | Cimatti et al. | |
| 2011/0000721 A1 | 1/2011 | Hassett et al. | |
| 2011/0276210 A1 | 11/2011 | Tanaka | |

FOREIGN PATENT DOCUMENTS

| FR | 2 914 960 | 10/2008 |
|---|---|---|
| WO | WO 2010/087024 A1 | 8/2010 |

OTHER PUBLICATIONS

French Preliminary Search Report issued May 15, 2012, in French 1158128 filed Sep. 13, 2011.

\* cited by examiner

COOLING OF AN ELECTRIC MOTOR VIA HEAT PIPES

TECHNICAL FIELD OF THE INVENTION

The present invention relates to a system for cooling an engine of an automotive vehicle provided with a hybrid drive train comprising an electric motor and an internal combustion engine.

The invention further relates to vehicles with a hybrid drive train provided with an electric motor and an internal combustion engine and a cooling system.

PRIOR ART

Automotive vehicles with a hybrid drive train provided with an electric drive system and an internal combustion drive system are provided with cooling systems which are specific to each drive train as the different drive trains are not always acted upon at the same time. The electric drive system is generally acted upon during the start-up phase of the vehicle and the traveling phase of the vehicle over a few kilometers. The internal combustion engine is generally fired up after this start-up phase and traveling phase over a few kilometers, alternating with the electric motor. However, when traveling, the two drive trains may be acted upon at the same time, for example during a phase requiring a high level of power.

The patent applications, such as DE 102009054873 or WO2006010487, teach the implementation of a cooling system for a vehicle with a hybrid drive train comprising an internal combustion engine and an electric motor, the system comprising two cooling circuits, one thereof being specific to the electric motor.

The heat discharged by the electric drive system is generally evacuated from the vehicle.

A drawback, therefore, is the installation of a cooling circuit which is specific to the electric drive system.

A further drawback is the dissipation of a large quantity of heat as a pure loss without it being able to be utilized elsewhere.

An object of the invention is to remedy these drawbacks.

BRIEF SUMMARY OF THE INVENTION

The subject of the invention is a system for cooling an electric drive system of an automotive vehicle with a hybrid drive train comprising an electric drive system and an internal combustion drive system, the internal combustion drive system (11) comprising a fluid circulation circuit, characterized in that it comprises a heat storage tank connected to the fluid circulation circuit and to the electric drive system via heat pipes.

According to particular features of the invention:
 the fluid circuit comprises a coolant circuit portion in the direction of the storage tank and connected to a coolant circuit of the heat engine,
 the system comprises a coolant circulating means installed in the coolant circuit portion,
 the fluid circuit comprises a lubricating oil circuit portion in the direction of the storage tank and connected to a lubricating oil circuit of the heat engine,
 the system comprises an oil circulating means installed in the cooling circuit portion and the lubricating oil circuit portion,
 the circulating means installed in the coolant circuit portion comprises an electric pump and the circulating means installed in the lubricating oil circuit portion comprises an electric pump,
 the circulating means installed in the coolant circuit portion and the circulating means installed in the lubricating oil circuit portion are controlled by an electronic control unit as a function of the operating conditions of the electric drive system and of the internal combustion drive system and the temperature of the storage tank,
 the heat storage tank comprises a coolant exchange circuit connected to the coolant circuit portion,
 the storage tank comprises an oil exchange circuit connected to the oil lubricating circuit of the internal combustion engine,
 the stator comprises longitudinal apertures, the axes thereof being parallel to the axis of the stator and in that the apertures are designed to receive an end portion of the heat pipes,
 the stator is surrounded by an element comprising apertures designed to receive an end portion of the heat pipes,
 the control block comprises apertures designed to receive an end portion of the heat pipes,
 the heat tank comprises apertures designed to receive an end portion of the heat pipes,
 the storage tank and the liquid circuit and oil circuit each comprise at least one temperature sensor cooperating with an electronic control unit.

Further features of the invention will be set forth in the following description with reference to the accompanying drawings, given by way of non-limiting example for the purpose of clearly understanding the invention and how it may be implemented.

DETAILED DESCRIPTION OF THE FIGURES

Figure 1:
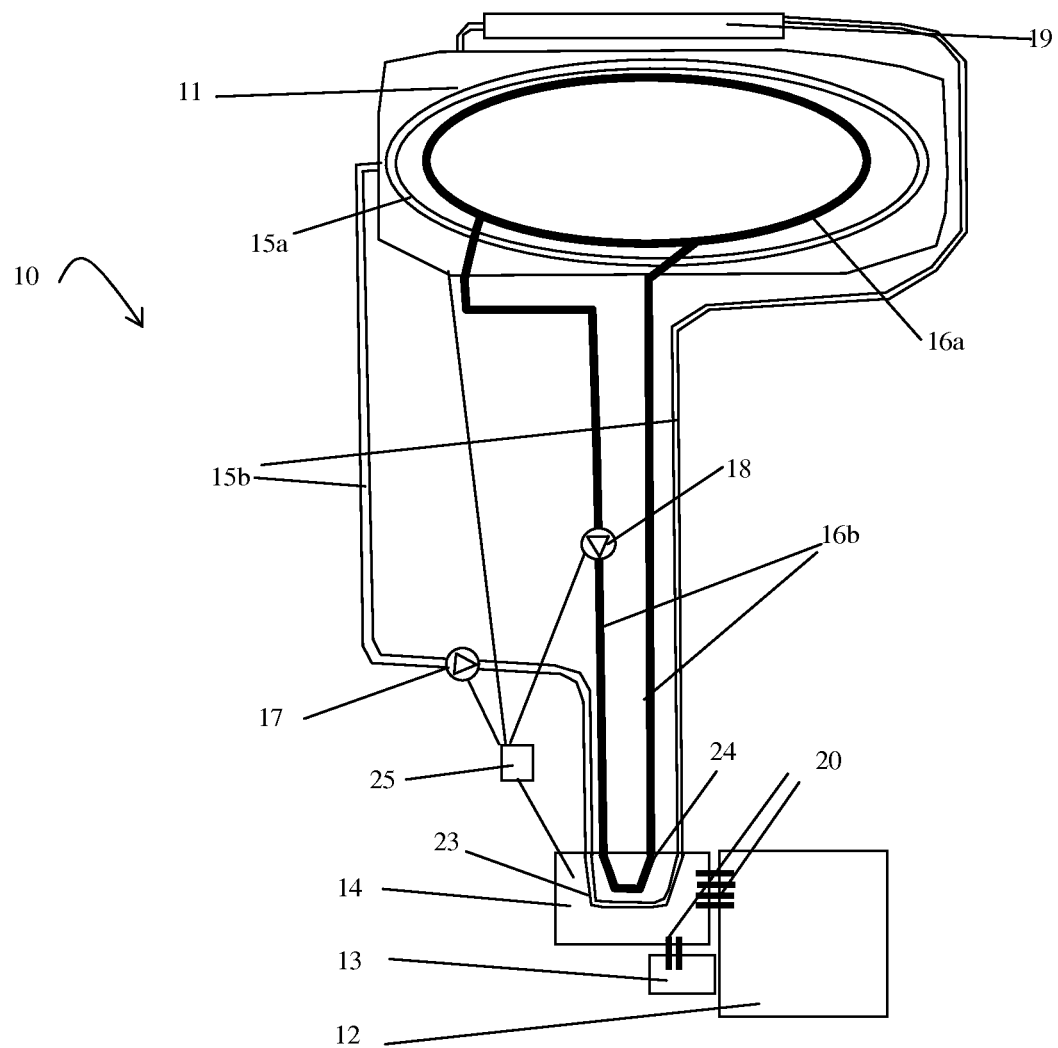
FIG. 1 is a schematic sectional view from above of an automotive vehicle provided with an electric motor and an internal combustion engine.

The same elements shown in the figures are denoted by the same reference numerals.

In FIG. 1, a vehicle (not shown) with a hybrid drive train is provided with an electric drive system 12 installed at the rear of the vehicle and an internal combustion drive system or thermal drive system 11 installed toward the front of the vehicle. The invention is not dependent on the positioning of the internal combustion drive system and the electric drive system which solely serve for describing an exemplary embodiment.

The internal combustion drive system 11 comprises a fluid circuit to maintain correct operation of the components of the thermal drive system. The fluid circuit comprises an oil circuit 16*a* and a coolant circuit 15*a*. The oil circuit is designed for lubricating and cooling the components of the heat engine, for example the pistons in a combustion chamber or a crankshaft installed in a crank chamber in a cylinder crankcase of the engine. The coolant circuit 15*a* is designed to cool elements of the structure of the heat engine such as the cylinder crankcase or a cylinder head (not shown) covering the cylinder crankcase. The oil circuit 16*a* exchanges heat with the coolant circuit 15*a* in the region of an oil/coolant exchanger (not shown). The coolant circuit 15a exchanges heat with the external environment in the region of a radiator 19.

The electric drive system comprises an electric motor 12, a control block 13 of the electric motor and a battery (not shown). The electric motor 12 comprises a stator 21 fixed to a body element of the vehicle (not shown), said stator comprising a chamber which is cylindrical about an axis, a rotor 22 which is mobile in rotation in the cylindrical chamber and a control block 13 of the electric motor.

The coolant circuit 15a comprises an additional bypass branch 15b for circulating liquid from the internal combustion engine at the front of the vehicle toward the electric drive system at the rear of the vehicle. This additional branch or portion of the coolant circuit 15b then joins the coolant circuit 15a at a point further downstream. A circulating means 17 is installed in the circuit portion 15b, said means being controlled by an electronic control unit 25. The coolant is capable of circulating at the front of the vehicle around the internal combustion engine and also of circulating toward the electric drive system. The circulating means may, for example, comprise a valve associated with actuating means for opening/closing the valve.

The lubricating oil circuit 16a comprises an additional bypass branch for circulating oil from the internal combustion engine at the front of the vehicle toward the electric drive system at the rear of the vehicle. This additional branch or lubricating oil circuit portion 16b then joins the oil circuit at a point further downstream of the oil circuit. A circulating means 18 is installed in said oil circuit portion, said means also being controlled by the electronic control unit 25. The oil is capable of circulating in the lubricating circuit of the internal combustion engine and also of circulating toward the electric drive system. The circulating means may, for example, comprise a valve associated with actuating means for opening/closing the valve.

A heat tank 14 is installed on a body element of the vehicle, to the rear of the vehicle and preferably attached to the electric motor 12. This heat tank may, for example, be a container containing a liquid or a material with thermal properties for storing heat. The volume of the tank may be several liters, for example five to twenty liters.

The interior of the tank comprises a first heat exchange circuit 23 connected to the coolant circuit portion 15b and a second exchange circuit 24 connected to the oil circuit portion 16b, the two exchange circuits being immersed in the liquid or the heat storage material. Apertures are formed in the tank, said apertures being designed to receive an end portion of heat pipes 20 of cylindrical tubular shape such that this end portion is in contact with the liquid or the heat storage material.

Figure 2:
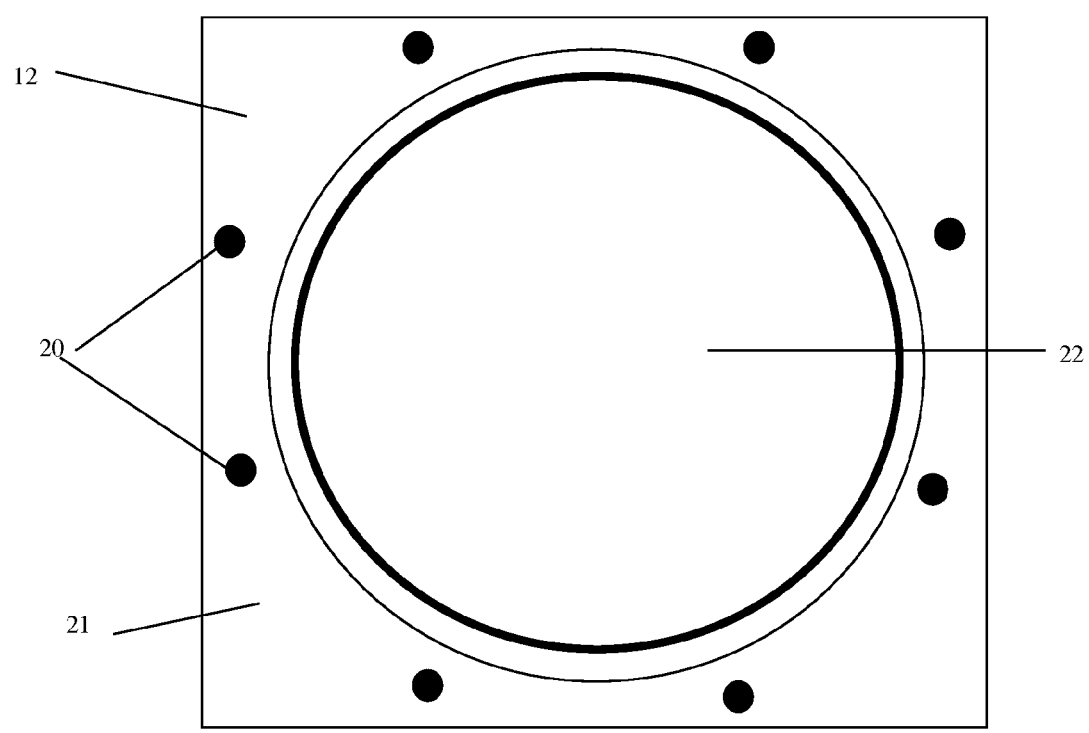
FIG. 2 is a schematic cross-sectional view of the electric motor.

According to an embodiment, apertures are formed in the stator, said apertures being designed to receive an end portion of the heat pipes. On the walls of these apertures a contact paste is distributed, said contact paste being designed to ensure tight thermal contact as shown in FIG. 2.

One end of the heat pipes 20 is introduced into the apertures in the heat storage tank 14 and the other end of the heat pipes is introduced into the apertures in the stator 21. The tank 14 is preferably placed in the vicinity of the electric motor and the stator 21 such that a portion of the heat pipe not covered by the tank 14 and by the stator 21 is reduced to a maximum extent or possibly covered with thermally insulating material such as a fiber coating.

Heat pipes 20 may also be introduced into apertures formed in the control block 13 of the electric motor.

Temperature sensors (not shown) are installed in:
the heat storage tank 14,
in the coolant circuit 15a,
in the lubricating oil circuit 16a,
and cooperate with the electronic control unit 25.

The electric drive system 12 is generally acted upon during the start-up phase and traveling phase over short distances. The operation of the electric drive system is accompanied by a considerable discharge of heat. This heat is transferred from the "hot" point represented by the stator 21 and the control block 13 toward the "cold" point which is the storage tank 14.

The heat engine 11 is started up but not acted upon during the first kilometers. The components of the heat engine are still "cold" and, in particular, the lubricating oil. The electronic control unit 25 is arranged so as to control an operation of the circulating means 18 and to permit a circulation of oil toward the heat storage tank circulating via the oil circuit portion 16b.

The oil then enters the heat tank 14 where it absorbs heat in the oil exchange circuit 24 and from where it emerges to return toward the internal combustion engine. The exchanged heat makes it possible to raise the temperature of the lubricating oil more rapidly which permits a rise in temperature of the components of the engine. The oil also becomes less viscous which reduces the friction between the lubricated parts and thus reduces the consumption of energy.

When the temperature of the oil reaches an operating temperature threshold, the circulating means of the oil circuit 18 may be stopped again, preventing the circulation of oil in the oil circuit portion 16b.

If the temperature in the storage tank is lower than a threshold temperature, the two circulating means 17, 18 are stopped and no fluid may be circulated toward the coolant circuit portion 15b and the oil circuit portion 16b. As a result, no exchange of heat is carried out between the heat engine and the electric motor.

If the temperature in the storage tank 14 is higher than a threshold value, the control unit controls the operation of the circulating means 17 of the coolant circuit portion 15b. The coolant is then able to circulate to the rear of the vehicle toward the storage tank 14. The coolant passes via the coolant circuit portion 15b, enters the storage tank 14, circulates in the cooling exchange circuit 23 where it absorbs heat and emerges from the tank to return toward the internal combustion engine, preferably upstream of the heat exchange radiator 19.

The system thus permits the cooling of the electric drive system 12 via the cooling circuit 15a of the heat engine 11 and the utilization of the heat discharged when the electric drive system is acted upon, to reduce the consumption of energy.

The invention is not limited to the embodiments set forth above. Further embodiments may be proposed by the person skilled in the art, for example by installing pumps in place of valves to improve the circulation of fluids in the circuit portions or by surrounding the hot points (stator, control block) with an element comprising apertures to receive an end portion of the heat pipes.

If the circulating means comprise circulating pumps which are preferably electrical, the cooling of the storage tank 14 and thus of the electric drive system may be effected by the cooling circuit 15a and also by the oil lubricating circuit 16a of the heat engine, even when the heat engine is stopped, which permits an additional saving of energy.

The shape of the heat pipes may also be varied to improve the exchange surfaces with the electric motor and with the heat storage tank.

The invention claimed is:

1. A system to cool an electric drive system of an automotive vehicle with a hybrid drive train comprising:
   an electric drive system; and
   a thermal drive system including at least one fluid circulation circuit including a lubricating oil circuit portion connected to a lubricating oil circuit of the thermal drive system and a cooling circuit portion connected to a cooling circuit of the thermal drive system,
   wherein the system comprises a heat storage tank including a coolant exchange circuit connected to the coolant circuit portion and an oil exchange circuit connected to the lubricating oil circuit portion, and
   wherein said tank is connected to the at least one fluid circulation circuit via a heat exchange circuit and to the electric drive system via heat pipes such that heat from the electric drive system is transferred to the thermal drive system.

2. The system as claimed in claim 1, further comprising a liquid electric pump installed in the coolant circuit portion.

3. The system as claimed in claim 1, further comprising a liquid electric pump installed in the cooling circuit portion and an oil electric pump installed in the lubricating oil circuit portion.

4. The system as claimed in claim 3, wherein the liquid electric pump installed in the coolant circuit portion and the oil electric pump installed in the lubricating oil circuit portion are controlled by an electronic control unit as a function either of operating conditions of the electric drive system and of the thermal drive system, or the temperature of the storage tank.

5. The system as claimed in claim 1, wherein the electric drive system comprises a stator comprising apertures to receive an end portion of the heat pipes.

6. The system as claimed in claim 1, wherein the electric drive system comprises a control block comprising apertures to receive an end portion of the heat pipes.

7. The system as claimed in claim 1, wherein the heat storage tank comprises apertures to receive an end portion of the heat pipes.

8. The system as claimed in claim 1, wherein the tank and a liquid circuit and an oil circuit each comprise a temperature sensor cooperating with an electronic control unit.

9. The system as claimed in claim 1, the system further comprising a liquid valve installed in the cooling circuit portion and an oil valve installed in the lubricating oil circuit portion.

* * * * *